United States Patent [19]

Ooki et al.

[11] Patent Number: 5,707,132
[45] Date of Patent: Jan. 13, 1998

[54] VEHICULAR LAMP AND MACHINE AND METHOD FOR MOULDING THE SAME

[75] Inventors: Seiichi Ooki; Makoto Sano, both of Shizuoka, Japan

[73] Assignee: Koito Manufacturing Co., Ltd., Tokyo, Japan

[21] Appl. No.: 421,264

[22] Filed: Apr. 13, 1995

[30] Foreign Application Priority Data

Apr. 20, 1994 [JP] Japan .................................. 6-104294

[51] Int. Cl.⁶ .................................................. B60Q 1/00
[52] U.S. Cl. .......................... 362/61; 362/311; 362/338
[58] Field of Search .......................... 362/61, 80, 80.1, 362/310, 311, 338

[56] References Cited

U.S. PATENT DOCUMENTS

| | | | |
|---|---|---|---|
| 5,158,350 | 10/1992 | Sato | 362/61 |
| 5,287,101 | 2/1994 | Serizawa | 340/815.76 |
| 5,388,037 | 2/1995 | Umeda et al. | 362/80 |
| 5,394,310 | 2/1995 | Iwasaki | 362/61 |

*Primary Examiner*—James C. Yeung
*Attorney, Agent, or Firm*—Sughrue, Mion, Zinn, Macpeak & Seas

[57] ABSTRACT

A vehicular lamp including a front lens formed by resin molding having a projecting part a thickness of which is larger than that of the other parts of the lens. A clearance lamp is integrally molded with a front lens including a side turn signal lens part projecting toward a front surface of the front lens. The side turn signal lens part projects like a tricornered roof inside which a light bulb for the side turn signal lamp is disposed closely adjacent to the lens. The thickness of the side turn signal lens part is made thicker than the other parts of the front lens.

9 Claims, 5 Drawing Sheets

VEHICULAR LAMP AND MACHINE AND METHOD FOR MOULDING THE SAME

BACKGROUND OF THE INVENTION

The present invention is directed to a vehicular lamp having a projecting part, for example, a clearance lamp with a side turn signal lamp integrally formed therewith. The invention also relates to a machine and method for manufacturing such a vehicular lamp.

There has been known a conventional clearance lamp in which a side turn signal lamp is formed integrally at one part thereof. FIG. 6 is a perspective view showing a conventional clearance lamp of this type, which is mounted on a front right side of a vehicle body. A lamp body 1 houses therein a light bulb 31 for a clearance lamp and a light bulb 32 for a side turn signal lamp. An amber cap 4 covers the light bulb 32 so that light emitted from the side turn signal lamp is colored amber.

A front lens 5 is mounted in an opening of the lamp body 1 extending from the front to side of the lamp body. The front lens 5 is formed of a transparent resin, a large part of which is constituted by a clearance lens part 5C which transmits light from the light bulb 31 for the clearance lamp. The front lens 5 is also provided with a side turn signal lens part 5S at one part thereof which projects like a tricornered roof so that light emitted from the light bulb 32 for the side turn signal lamp and colored by the amber cap 4 can be easily viewed even from a side-rear position of the lamp.

The conventional front lens 5 of the clearance lamp thus constituted is injection molded with resin in suck a manner as to have a substantially constant thickness at all portions thereof, from the clearance lens part 5C to the side turn signal lens part 5S. Generally, the front lens 5 of this type is molded by an injection molding apparatus, a gate G of which is disposed at one side of the lens 5 for injecting resin into a cavity (not shown) of the molding apparatus, as schematically shown in FIG. 7. When the lens is molded with resin, the resin is injected from the gate G and flows into the cavity of the molding apparatus, wherein a flow distance of resin flowing at a part of the cavity corresponding to the side turn signal lens part 5S of the front lens is longer than that of the other part of the cavity corresponding to the clearance lens part 5C because the former is bent to form the projecting side turn signal lens part 5S, as indicated by broken lines in FIG. 7. Therefore, injected resin flow (a) through the part of cavity for molding the side turn signal lens part 5S reaches a position in the cavity on the opposite side of the gate G with respect to the side turn signal lens part 5S with some delay compared to the resin flows through the other parts of the cavity. Accordingly, the other resin flows (b) and (c) collide against each other at this position of the cavity, which collision may enclose air.

The enclosed air is stretched linearly by the pressures of the injected resins to thereby generate a weld line W, as a result of which the external appearance of the front lens is degraded. If the weld line is conspicuous, light may be reflected diffusely therefrom so that the external appearance is degraded to a great extent, especially while the lamp is turned on.

Further, since the side turn signal lens part 5S projects from the clearance lens part 5C, that is, it projects outward of the vehicle, the side turn signal lens can rather easily strike against an obstacle such as a wall or a telegraph pole. Accordingly, the side turn signal lens part 5S is easily damaged, and the possibility of breakage of the lens of the clearance lamp or the clearance lamp itself is increased because the mechanical strength of the front lens is lowered at the weld line.

Furthermore, when the side turn signal lamp is turned on, the side turn signal lens part 5S is more strongly heated than the clearance lens part 5C because the light bulb 32 for the side turn signal lamp and the amber cap 4 are disposed close to the side turn signal lens 5S in order to illuminate only the side turn signal lens part 5S while preventing the clearance lens part 5C from being illuminated. The side turn signal lens part 5S may be easily deformed by the heat.

SUMMARY OF THE INVENTION

The present invention was made in view of the foregoing problems accompanying the conventional vehicular lamp.

Accordingly, it is an object of the present invention to provide a vehicular lamp which is capable of preventing a weld line from being generated in a front lens during injection molding of the same although a part of the front lens projects from other parts.

Further, it is another object of the present invention to provide a vehicular lens having improved mechanical strength of a projecting part of a front lens while suppressing the possibility of breakage of the lamp.

It is still another object of the present invention to provide a vehicular lens capable of suppressing deformation of a projecting part of a front lens due to heat.

It is still another object of the present invention to provide a molding apparatus for resin molding a vehicular lamp capable of preventing the formation of an undesirable weld line caused by a projecting part of a front lens, and also preventing the projecting part from being damaged or deformed due to heat.

It is still another object of the present invention to provide a method for molding a vehicular lamp capable of preventing the formation of an undesirable weld line caused by a projecting part of a front lens, and also preventing the projecting part from being damaged or deformed due to heat.

The above and other objects are achieved by the provision of a vehicular lamp which, according to the present invention, includes a front lens formed by resin molding having a projecting part the thickness of which is larger than that of other parts of the lens. For example, when the present invention is applied to a clearance lamp formed by resin molding a front lens including a side turn signal lens part forming a side turn signal lamp projecting toward a front surface of the front lens, and the side turn signal lens part projects like a tricornered roof inside which a light bulb for the side turn signal lamp is disposed closely adjacent to the lens, the thickness of the side turn signal lens part is made thicker than other parts of the front lens.

Further, a machine for manufacturing vehicular lamps according to the present invention includes a molding apparatus for resin molding a front lens provided with a projecting part projecting from a part of the front lens toward a front surface thereof. The molding apparatus has defined therein a cavity for forming the front lens, wherein the dimensions of a cavity gap for the projecting part of the front lens are made larger than for other parts thereof.

Furthermore, a method for manufacturing a vehicular lamp includes steps of preparing a molding apparatus for resin molding a front lens having a projecting part, wherein the dimensions of a cavity gap for the projecting part of the front lens are larger than for other parts thereof, and injecting resin into the cavity for forming the projecting part and the other parts at the same time.

Because the thickness of the projecting part of the front lens is larger than that of other parts thereof according to the present invention, the injected resin can smoothly flow in the cavity for forming the projecting part during the resin molding process, and, accordingly, any irregular resin flow in the vicinity of the projecting part is suppressed to thereby effectively prevent an undesirable weld line from being formed.

Moreover, since the thickness of the projecting part of the front lens is larger than that of the other parts thereof according to the present invention, the mechanical strength of the projecting part is improved, thereby reducing the possibility of damage to and deformation of the front lens due to heat generated by the light bulb. The reliability of the front lens is thus improved.

DESCRIPTION OF THE PREFERRED EMBODIMENTS

The present invention will now be described with reference to the accompanying drawings.

Figure 1:
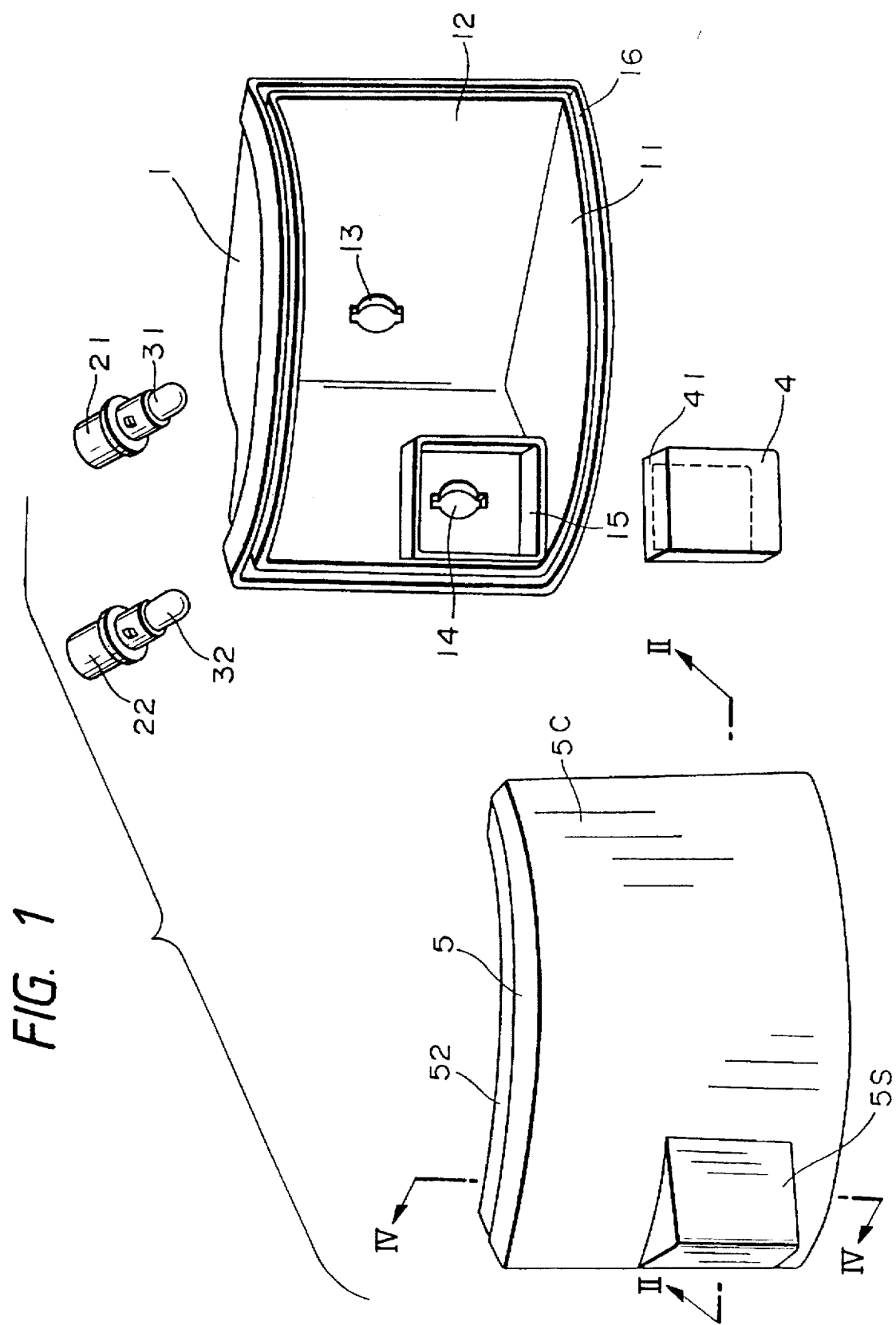
FIG. 1 is a partially exploded perspective view showing a vehicular clearance lamp with a side turn signal lamp constructed in accordance with the present invention.
Figure 2:
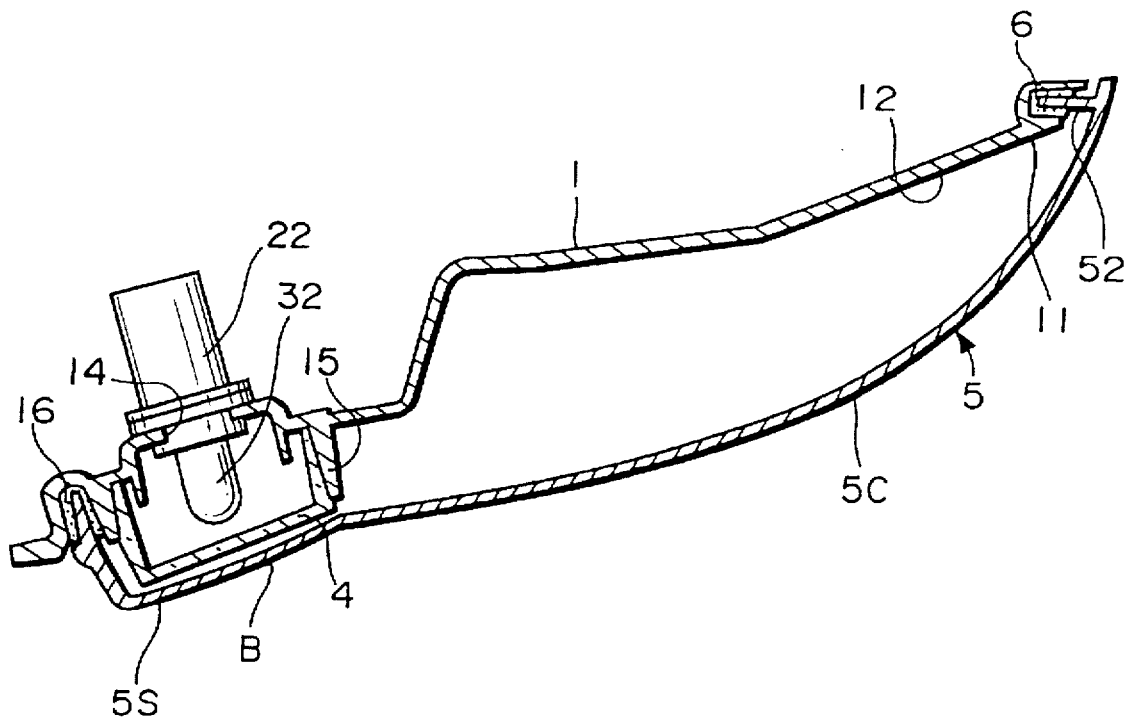
FIG. 2 is a side sectional view of the clearance lamp shown in FIG. 1 taken along line II—II.
Figure 6:
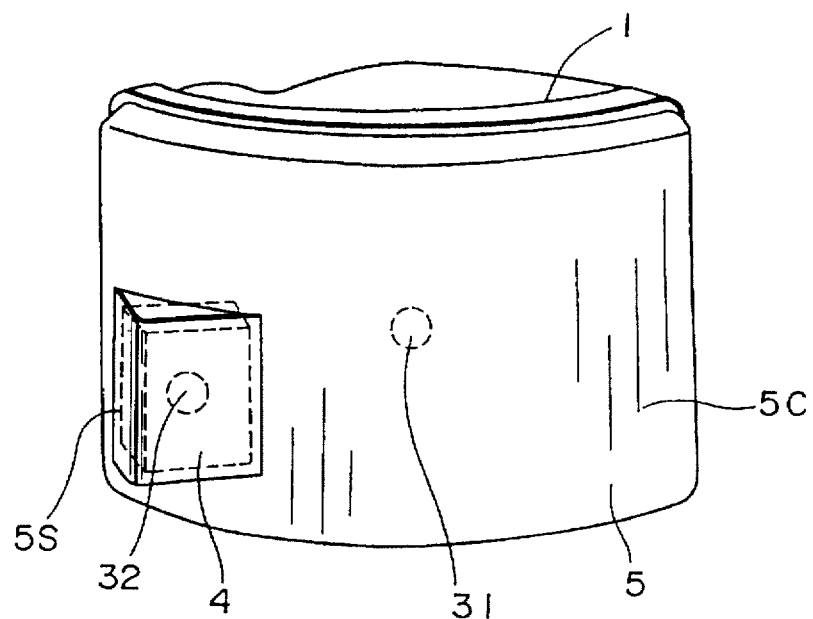
FIG. 6 is a perspective view showing a conventional clearance lamp mounted on a front right fender of a vehicle body.

FIG. 1 is a partially exploded perspective view showing a vehicular clearance lamp with a side turn signal lamp embodying the present invention. The external appearance of the assembly shown in FIG. 1 is the same as the conventional lamp illustrated in FIG. 6. FIG. 2 is a side sectional view of the clearance lamp shown in FIG. 1 taken along line II—II.

In these FIGS., a lamp body 1 is mounted on a front right fender of a vehicle body (not shown). The lamp body 1 is provided with a front opening 11 curving from the front to the side thereof. The lamp body 1 is formed by injection molding with a black resin. The inner surface of the lamp body 1 is coated with a thin layer of aluminum so that the inner surface of the lamp body forms a reflector 12.

The lamp body 1 is provided at the rear thereof with a pair of bulb through-holes 13 and 14 in which are engaged bulb sockets 21 and 22, respectively. Bulbs 31 and 32 are supported in the bulb socket 21 and 22, respectively. The bulb 31, which is positioned slightly above the bulb 32, acts as the light source of the clearance lamp, whereas the bulb 32 constitutes the light source of the side turn signal lamp. The bulb sockets 21 and 22 are inserted into the respective bulb through-holes 13 and 14 from the rear of the lamp body 1, and are engaged therewith by a bayonet structure. Each of the bulbs 31 and 32 is constituted by a clear bulb. The bulb 32 for the side turn signal lamp is covered with a cap 4 having an amber color. The amber cap 4 has a rectangular box shape in cross section. The amber cap 4 has an opening peripheral part 41 which is inserted into a rectangular wall part 15 formed on the lamp body 1 so as to surround the bulb through-hole 14, and is strongly secured thereto by an adhesive.

Figure 3:
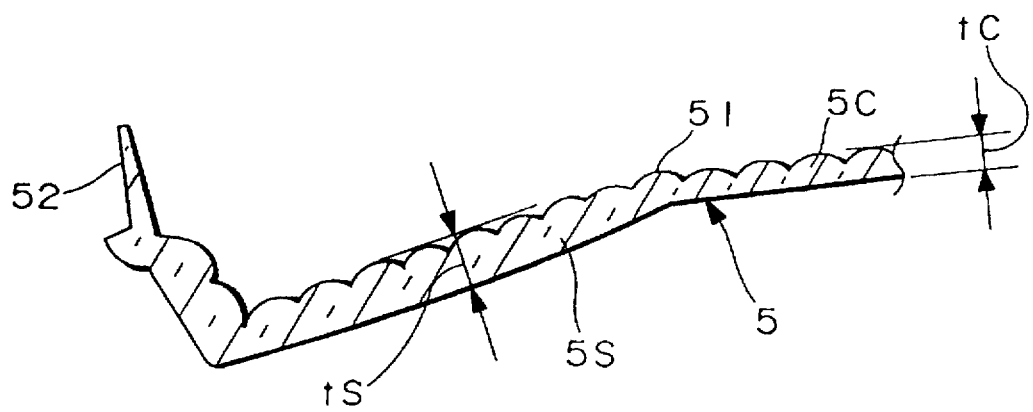
FIG. 3 is a partially enlarged view showing the side turn signal lens part at a portion B in FIG. 2.

On the other hand, the lamp body 1 is provided with a concave seal groove 16 formed along the periphery of the front opening 11 thereof. Utilizing the seal groove 16, as described in more detail hereinbelow, a front lens 5 having a surface shape corresponding to the curvature of the right front fender of the vehicle is mounted over the front opening 11 of the lamp body 1. The front lens 5 is formed of a transparent resin. Lens steps 51 having a desired shape, such as hemispherical or the like, are formed on the inner surface of the curved lens 5, as shown in FIG. 3. A seal leg 52 projects from the periphery of the front lens 5 in a direction substantially perpendicular to the lens face thereof. The seal leg 52 is inserted into the seal groove 16, which is thereafter filled with a sealing material 6 such as a hot melt, for example. When the sealing material 6 has hardened, the front lens 5 is securely mounted on the lamp body 1.

A large part of the front face of the front lens 5 is constituted by a clearance lens part 5C which transmits light emitted from the light bulb 31 for the clearance lamp. On the front face of the front lens 5, a side turn signal lens part 5S is also formed at a part thereof which projects from the front face of the lens 5 like a tricornered roof.

As shown in FIG. 3, the lens thickness $t_e$ of the side turn signal lens part 5S is larger than the lens thickness $t_c$ of the clearance lens part 5C. In the present embodiment, the side turn signal lens part 5S is approximately 1 to 2 mm thicker than the clearance lens part 5C.

Corners of the side turn signal lens part 5S having the tricornered roof shape are rounded as desired, and the boundaries between the clearance lens part 5C and the four lens faces constituting the side turn signal lens part 5S have a curved shape so that the two lenses are connected to each other smoothly and continuously.

Figure 4:
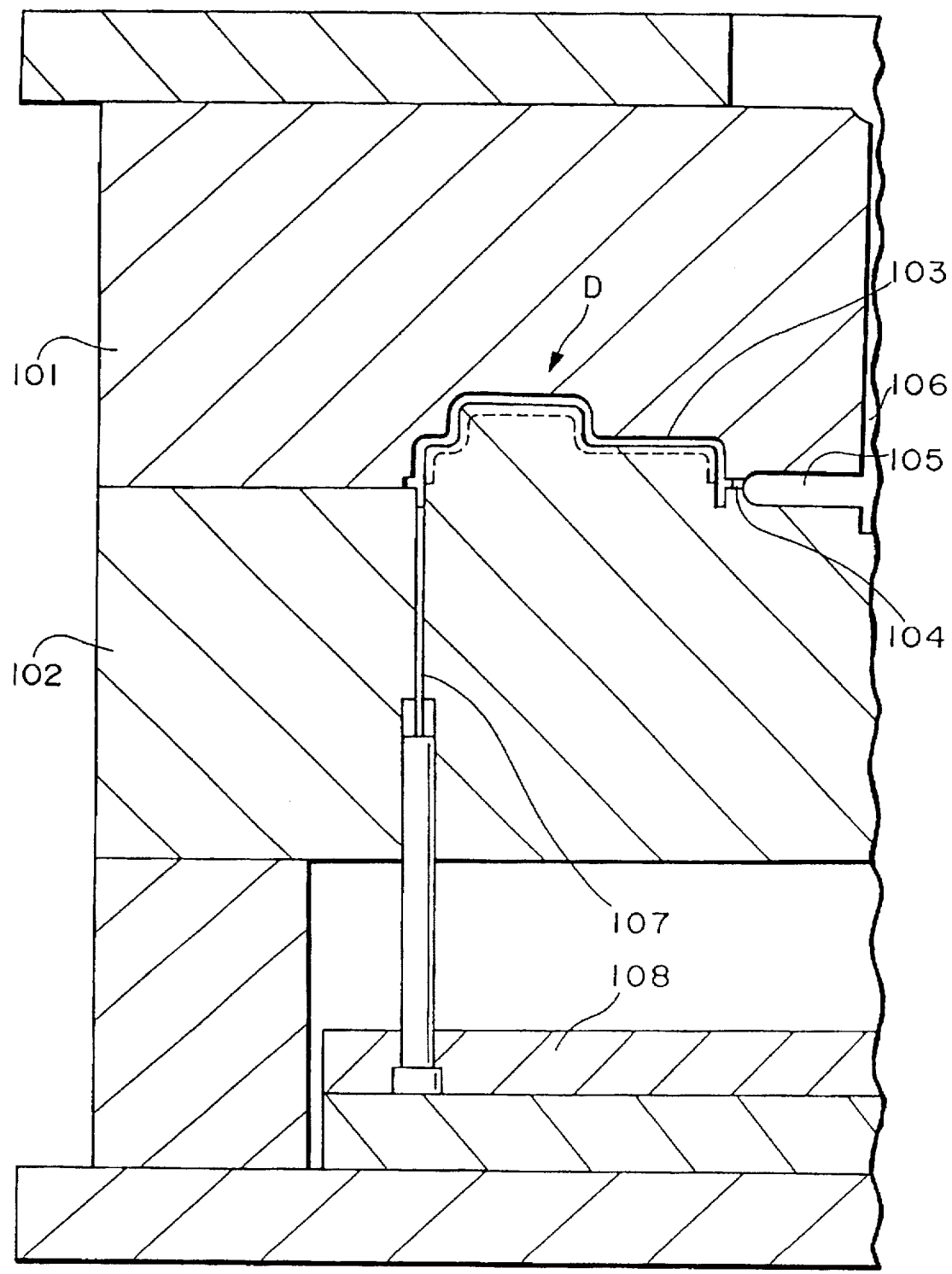
FIG. 4 is a cross-sectional view of a molding apparatus for resin molding a front lens shown in FIG. 1 taken along line IV—IV.

FIG. 4 is a cross-sectional view of a molding apparatus for resin molding the front lens 5 taken along line IV—IV in FIG. 1. A stationary mold 101 and movable mold 102 define a cavity 103 for the lens 5. At a part of the stationary mold 101 which confronts the cavity 103, that is, a side part on the periphery of the front lens 5, there is provided an opening or gate 104 for injecting fused resin. The gate 104 communicates with a sprue 106 through a runner 105. The sprue 106 connects to an injection nozzle of an injection molding machine (not shown) on which the molding apparatus is set.

A pushing pin 107 is disposed in the movable mold 102 at a part thereof. The bottom portion of the pushing pin 107 is supported by a pushing plate 108. After molding the front lens 5 in the cavity 103, the movable mold 102 is removed from the stationary mold 101 and the pushing plate 108 moved towards the movable mold 102, as a result of which the tip end of the pushing pin 107 pushes the molded front lens 5 out of the movable mold 102.

Figure 5:
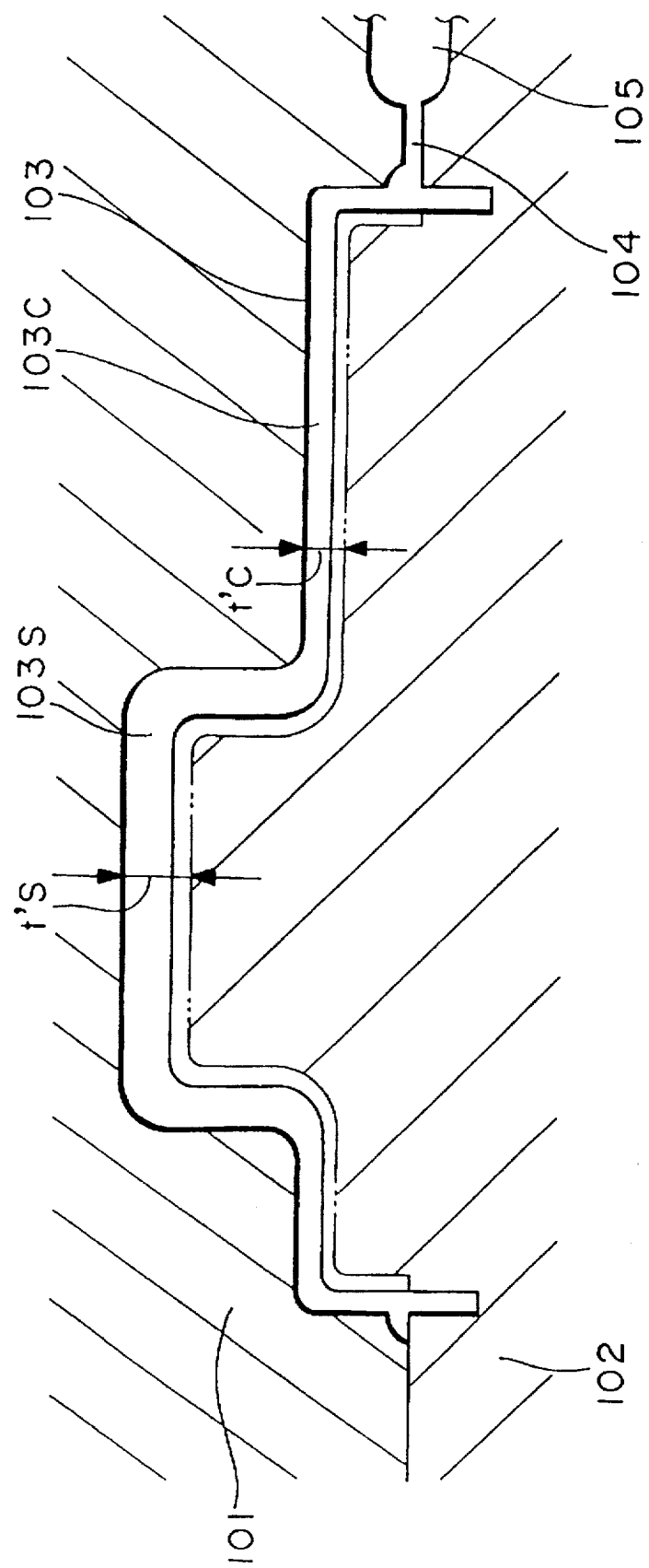
FIG. 5 is an enlarged view of a portion D of the molding apparatus shown in FIG. 4.

FIG. 5 is an enlarged view of a portion D of the molding apparatus shown in FIG. 4. As shown in FIG. 5, the cavity 103 includes a cavity section 103S for molding the side turn signal lens part 5S and a cavity section 103C for molding the clearance lens part 5C. The width of the cavity gap $t_e'$ of the cavity section 103S is made larger than that of the cavity gap $t_c'$ of the cavity section 103C. On the other hand, corners of the cavity section 103S corresponding to the corners of the side turn signal lens part 5S are rounded as desired, and each of the boundaries between the cavity section 103S and the cavity section 103C has a curved shape so that the two cavity sections are connected to each other smoothly and continuously.

When the front lens is resin molded with the molding apparatus thus constructed, clear transparent resin is injected from the sprue 106 through the runner 105 and the gate 104 into the cavity 103. The cavity 103 is then filled with the injected resin, which is thereafter cooled and solidified. After the resin is solidified, the movable mold 102 is retracted from the stationary mold 101, and thereafter the pushing plate 108 moves towards the movable mold 102. Then the molded lens, which is still adhered to the movable mold 102, is pushed out of the movable mold 102 by the tip end of the pushing pin 107.

During the molding process, when the injected resin is filling the cavity 103, the resin flows into the cavity section 103S for the side turn signal lens part 5S smoothly because the width of the cavity gap $t_s'$ of the cavity section 103S is larger than the width of the cavity gap $t_c'$ of the cavity section 103C. The smooth flows of the resin is enhanced by the rounded corners of the cavity section 103S, and also by the boundaries between the cavity section 103S and due to the fact that the cavity section 103C have a curved shape and are connected to each other smoothly and continuously. Accordingly, even if the flow distance of resin flowing in the cavity section 103S corresponding to the side turn signal lens part 5S of the front lens is longer than that of the other parts of the cavity corresponding to the clearance lens part 5C, the injected resin flowing through the cavity section 103S reaches a position of the cavity on the opposite side of the gate 104 with respect to the side turn signal lens part 5S substantially at the same time as the resin flowing through the cavity section 103C.

Figure 7:
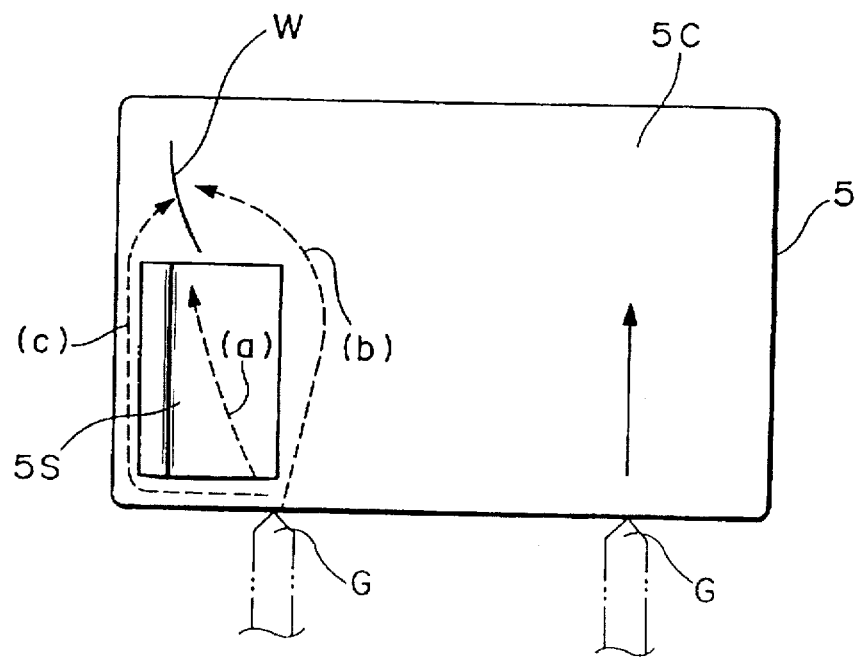
FIG. 7 is a schematic view showing a condition of the conventional clearance lamp in which a weld line is generated.

Owing to the smooth flow accomplished by the present invention, no collision of resin flows occurs, and no undesirable weld line W as shown in FIG. 7 is formed at the position of the cavity on the opposite side of the gate 104 with respect to the side turn signal lens part 5S. Therefore, the external appearance of the front lens is not degraded due to a weld line W. Further, since the light is not diffusely reflected by a weld line, the external appearance of the lamp is not degraded when the lamp is turned on. Also, the light distribution characteristics are not affected.

On the other hand, with the front lens according to the present invention which is resin molded as described above, since the lens thickness $t_s$ of the side turn signal lens part 5S is larger than the lens thickness $t_c$ of the clearance lens part 5C, the mechanical strength of the front lens is improved. Accordingly, although the side turn signal lens part 5S projects outward when installed on a vehicle, it is not easily damaged. Therefore, the possibility of damage to the lens of the clearance lamp or the clearance lamp itself is decreased. The reliability of the clearance lamp is thus improved.

Further, even though the light bulb 32 for the side turn signal lamp and the amber cap 4 are disposed close to the side turn signal lens 5S, the side turn signal lens part 5S is prevented from being easily deformed by heat generated by the bulb when the side turn signal lamp is turned on because the lens thickness of the side turn signal lens part 5S is made larger.

It has further been found that suppression of the formation of a weld line, improvement in mechanical strength and prevention of deformation due to heat all can be effectively accomplished if the lens thickness $t_s$ of the side turn signal lens part 5S is approximately 10 to 20% thicker than the lens thickness $t_c$ of the clearance lens part 5C.

Although in the foregoing embodiment the present invention is applied to a clearance lamp with an integrally formed side turn signal lamp, the invention is not limited thereto or thereby. The present invention can be also applied to any lens having a part projecting from other parts, and especially to a lamp having a light bulb disposed close to a projecting part of the lens. Of course, the thickness of the projecting part of the lens and that of the other parts thereof should be designed with reference to the type of lamp, shape of the projecting part, type of bulb and light intensity of the bulb or the like.

As described above, according to the present invention, because the thickness of the projecting part of the front Lens is larger than that of the other parts thereof, the injected resin can smoothly flow in the cavity for forming the projecting part during the resin molding process. Accordingly, irregular resin flow in the vicinity of the projecting part is suppressed to thereby effectively prevent an undesirable weld line from being formed.

Further, since the thickness of the projecting part of the front lens is larger than that of the other parts thereof, the mechanical strength of the projecting part is improved, thus reducing the possibility of damage to and deformation of the front lens due to heat produced by the light bulb. The reliability of the front lens is thus improved.

For example, when a clearance lamp is produced by resin molding with a front lens including a side turn signal lens part projecting toward the front surface of the front lens, and the light bulb for the side turn signal lamp is disposed close to the lens, the formation of an undesirable weld line is prevented, the mechanical strength of the projecting part is improved, and deformation of the front lens due to heat produced by the light bulb is also avoided by making the thickness of the side turn signal lens part thicker than other parts of the front lens.

Further, a machine for manufacturing vehicular lamps according to the present invention includes a molding apparatus for resin molding a front lens provided with a part projecting from a part of the front lens toward the front surface thereof. The molding apparatus has defined therein a cavity for forming the front lens. The dimension of the cavity gap for the projecting part of the front lens is larger than that for the other parts thereof. Accordingly, no collision of resin flows occurs, and no undesirable weld line is formed.

It should be understood that the form of the invention herein shown and described is to be taken as a preferred example of the invention, and that various changes in the shape, size and arrangement of parts may be resorted to without departing from the spirit of the invention or the scope of the subjoined claims.

What is claimed is:

1. A vehicular lamp, comprising:
   at least one light bulb;
   a lamp body having a front opening and at least one through-hole with which said bulb is engaged; and
   a front lens mounted on said front opening of said lamp body, said lamp body comprising a first lens part and a second lens part projecting from said first lens part, a thickness of said second lens part being thicker than that of said first lens part so as to provide at least one of a mechanical, optical or astethic advantage.

2. The vehicular lamp according to claim 1, wherein said first lens part is a clearance lens part and said second lens part is a side turn signal lens part of a curved clearance lamp, and said second lens part being disposed at a side of said first lens part, said second lens part projecting toward a front face of said first lens part.

3. The vehicular lamp according to claim 2, wherein said side turn signal lens part projects like a tricornered roof, and one of said light bulb is disposed inside said projecting lens part closely adjacent thereto.

4. The vehicular lamp according to claim 1, wherein said front lens is formed of a transparent resin.

5. The vehicular lamp according to claim 1, wherein said front lens comprises lens steps formed on an inner surface of said front lens.

6. The vehicular lamp according to claim 5, wherein each of said lens steps has a hemispherical shape.

7. The vehicular lamp according to claim 1, wherein the thickness of said second lens part is 10 to 20% thicker than that of said first lens part.

8. The vehicular lamp according to claim 7, wherein the thickness of said second lens part is 1 to 2 mm thicker than that of said first lens part.

9. The vehicular lamp according to claim 1, wherein said second lens part comprises rounded corners, and each boundary between said first lens part and said second lens part has a curved shape so that said first and second lens parts are connected to each other smoothly and continuously.

* * * * *